United States Patent [19]
Stapleton

[11] 3,866,801
[45] Feb. 18, 1975

[54] DISPENSER WITH METERING TUBE HAVING OUTLET VALVE

[76] Inventor: Johnny R. Stapleton, 907 Ayers St., Coffeyville, Kans. 67337

[22] Filed: Aug. 28, 1973

[21] Appl. No.: 392,326

[52] U.S. Cl. .............................. 222/146 C, 222/510
[51] Int. Cl. ............................................... B67d 5/62
[58] Field of Search ............ 222/510, 146 R, 146 C, 222/129.1, 129.4, 504

[56] References Cited
UNITED STATES PATENTS

| | | | |
|---|---|---|---|
| 1,527,714 | 2/1925 | Tarrant | 222/510 |
| 2,841,216 | 7/1958 | McKinnon | 222/510 X |
| 3,276,633 | 10/1966 | Rahauser | 222/129.1 |
| 3,502,247 | 3/1970 | Campbell | 222/510 X |
| 3,517,524 | 6/1970 | Fiedler | 222/129.1 X |

*Primary Examiner*—Robert B. Reeves
*Assistant Examiner*—Francis J. Bartuska
*Attorney, Agent, or Firm*—Clarence A. O'Brien; Harvey B. Jacobson

[57] ABSTRACT

A metering tube specially intended for use with a hopper-type soft serve freezer, and the like, has a longitudinally extending, hollow housing provided with a pair of openings arranged substantially at right angles to one another and adjacent a one longitudinal open end of the housing, and a valve element movably arranged in the housing for selective movement toward and away from a one of the openings forming a valve seat in the one open end of the housing. The housing is further provided with an enlarged portion adjacent the one longitudinal open end thereof, with the other of the openings arranged in this enlarged portion. Opening of a spigot on the freezer may actuate a solenoid connected to the valve element for moving same away from the valve seat and permitting a metered flow from one opening to the other through the housing.

2 Claims, 5 Drawing Figures

PATENTED FEB 18 1975
3,866,801
Fig. 1
Fig. 2
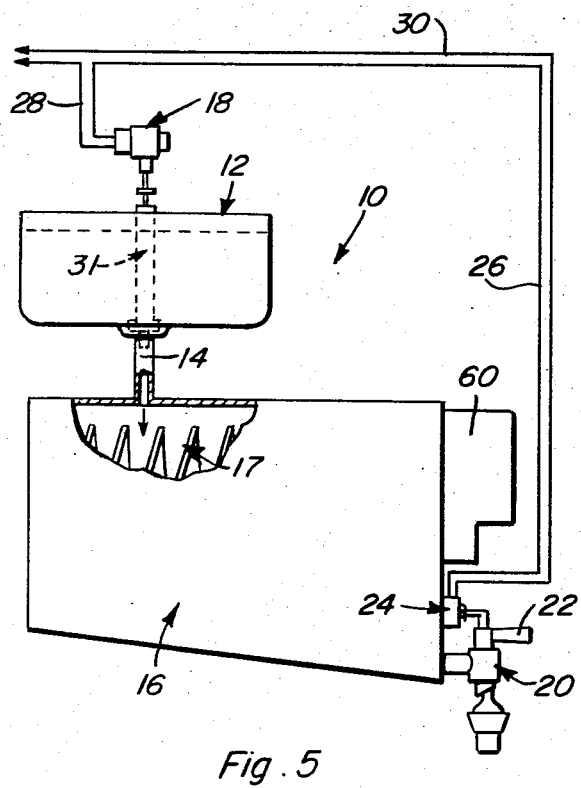
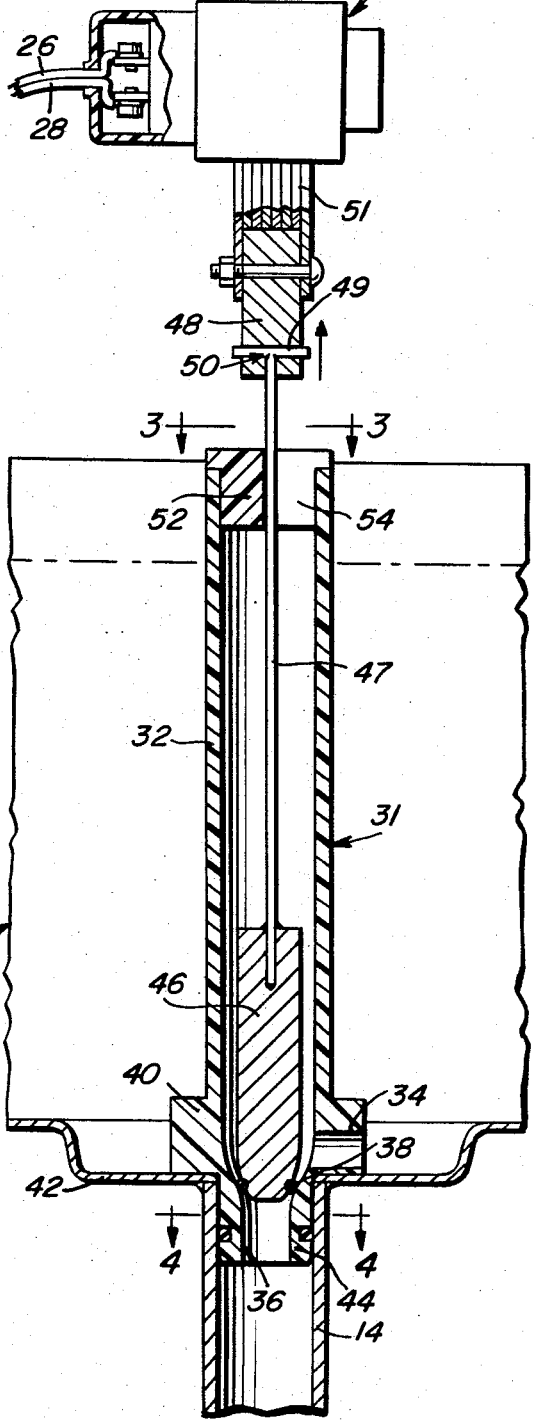
Fig. 5
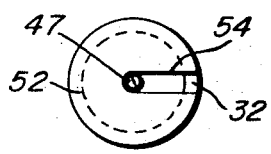
Fig. 3  Fig. 4
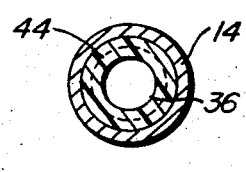

3,866,801

DISPENSER WITH METERING TUBE HAVING OUTLET VALVE

BACKGROUND OF THE INVENTION

1. Field of the Invention

This invention relates generally to a metering tube, and particularly to a metering tube able to produce a predetermined amount of overrun from a soft serve ice cream freezer, and the like.

2. Description of the Prior Art

Among problems encountered in the use of hopper-type serve ice cream freezers, and the like, are those of obtaining a desired liquid and air mix entering a freezing chamber of the freezer, and maintaining a constant amount of mix within the freezing chamber.

Measuring devices are known, such as those shown in U.S. Pat. Nos. 2,623,766, issued Dec. 30, 1952 to J. U. Richard, and 2,642,891, issued June 23, 1953 to R. D. Harrison et al., that use a reciprocating, drop valve element actuated by a solenoid, and the like. These known devices, however, are not suited for use with, for example, standard hoppers of the kind used with, for example, ice cream freezers.

SUMMARY OF THE INVENTION

It is an object of the present invention to provide apparatus for metering the amount of a liquid mix and air entering a freezing chamber and sealing the air inlet to prevent the air from escaping during a subsequent beater blending operation in the freezing chamber.

It is another object of the present invention to provide apparatus for maintaining a constant amount of mix within a freezing chamber of a soft serve freezer, and the like.

It is yet another object of the present invention to provide metering apparatus specifically suited for use with standard mixing hoppers, and the like.

These and other objects are achieved according to the present invention by providing a metering tube having: a housing provided with a pair of openings, one opening forming a valve seat; and a valve element movably arranged in the housing for selective movement toward and away from the one opening forming the valve seat. The valve element is advantageously connected to a solenoid, and the like, actuated by the spigot arranged for controlling flow from a mix freezing chamber associated with a hopper in which the metering tube is arranged.

The housing is preferably a longitudinally extending, hollow housing, and the openings provided in the housing are advantageously arranged adjacent to and substantially at right angles with respect to one another. One of the openings is arranged at a longitudinal end of the hollow housing, while the other opening is arranged in a wall portion of the hollow housing. The hollow housing may be a tube having spaced open ends, in which instance the one opening is in fact one of the open ends provided with a restriction to form the valve seat. The valve element is advantageously weighted and arranged for being normally biased toward this valve seat forming open end.

The tube may be provided with an enlarged portion arranged spaced from the one open end a distance permitting the enlarged portion to form an abutment engaging a bottom of a hopper and limiting insertion of the one open end in an oulet of the hopper, with the other opening being arranged passing through the enlarged portion.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a schematic, side elevational view showing a metering tube according to the present invention in combination with a hopper-type soft serve freezer.

FIG. 2 is a fragmentary, vertical sectional view showing in detail that portion of FIG. 1 including the metering tube according to the present invention and its associated actuating solenoid.

FIG. 3 is a sectional view taken generally along the line 3—3 of FIG. 2.

FIG. 4 is a sectional view taken generally along the line 4—4 of FIG. 2.

FIG. 5 is a fragmentary, horizontal sectional view showing in detail that portion of FIG. 1 including the freezer spigot and associated solenoid actuating switch.

DESCRIPTION OF THE PREFERRED EMBODIMENTS

Referring now more particularly to FIG. 1 of the drawings, a conventional hopper-type soft serve freezer 10 has a hopper 12 provided with an outlet pipe 14 connecting hopper 12 to a freezer barrel or freezing chamber 16. A beater 17 is arranged within chamber 16 for blending in a conventional manner the mixture of a liquid mix and air fed into the barrel. A conventional solenoid and plunger 18 is actuated by a conventional spigot 20 of chamber 16 as a function of the position of a handle 22 of spigot 20. When handle 22 is in a position permitting a flow from chamber 16, a cam attached to handle 22 will actuate a switch 24, which may be a suitable, known microswitch, and the like, to energize solenoid and plunger 18 as by wires 26, 28, and 30. Wires 28 and 30 would be connected to a suitable source of electrical energy (not shown). The actuation of microswitch 24 by handle 22 will be described in greater detail below.

Referring now to FIGS. 2 to 4 of the drawings, a metering tube 31 according to the present invention is arranged in outlet pipe 14 of hopper 12. This metering tube 31 is formed from a housing 32, which may be constructed from a suitable synthetic material such as an acetal resin or similar thermoplastic, provided with a pair of openings 34 and 36. Opening 36 is illustrated as forming a valve seat 38. As can be appreciated from FIG. 2 of the drawings, housing 32 is a longitudinally extending, hollow housing or tube, and openings 34 and 36 are arranged adjacent to and substantially at right angles with respect to one another. Opening 36 is axially arranged at one of the spaced open ends of the tube forming housing 32, while opening 34 is arranged in an enlarged portion 40 partially forming the wall of the tube making up housing 32. The open end of the tube in which opening 36 is formed is in turn provided with a restriction to form valve seat 38. As can be readily appreciated from FIG. 2 of the drawings, enlarged portion 40 of housing 32 is so arranged, and the housing itself is so dimensioned, that enlarged portion 40 will abut against a portion of hopper bottom 42 while open end 44 of housing 32 is inserted into outlet pipe 14 of hopper 12 so as to mount metering tube 31 in hopper 12 and specifically in outlet pipe 14.

A valve element 46, which may be constructed from a heavy material such as stainless steel, is movably arranged in housing 32 for selective movement toward and away from opening 36 and valve seat 38. A lift rod 47 connects valve element 46 to solenoid and plunger 18 by means of a mounting block 48 provided with an aperture 49 and associated slot arranged for receiving a T-bar end 50 of rod 47. A plunger 51 of the solenoid and plunger 18 is connected to mounting block 48 in a conventional manner, such as by the illustrated bolt and nut. Alignment of lift rod 47 with respect to housing 32 is assured by the provision of an alignment cap 52 shaped for fitting into the other open end of housing 32 and provided with a slot 54 permitting the ingress and egress of air with respect to housng 32.

FIG. 5 of the drawings shows one possible arrangement of a cam 56 on handle 22 so as to engage a contact 58 of microswitch 24 when handle 22 is moved in the direction of the arrow in FIG. 5 to open the spigot 20 and permit a flow from chamber 16. Alternatively, switch 24 could be located on the, for example, electrical control panel 60, and be actuated by a spring-loaded cam rod (not shown) positioned between the top of spigot 20 and the front of control panel 60. As handle 22 is turned, the cam rod base (not shown) would be rotated to actuate switch 24.

As can be seen in FIG. 2 of the drawings, suitable sealing rings, and the like, may be employed to assure the achievement of satisfactory seals between housing end 44 and outlet pipe 14 on the one hand, and valve seat 38 and valve element 46 on the other hand.

If desirable or found to be necessary, a, for example, hopper cover (not shown) may be arranged on hopper 12 in a conventional manner and provided with an aperture through which the upper end of housing 32 may pass in order to assure proper alignment of metering tube 31 in hopper 12. The unit may be easily cleaned by removing metering tube 31 entirely from hopper 12 once the hopper cover, if used, is removed from the hopper.

As can be readily understood from the above description and from the drawings, a hopper 12 is positioned directly over a freezer barrel or freezing chamber 16. Advantageously, the bottom of hopper 12 is recessed, as shown in FIG. 2 of the drawings, so that a liquid mix poured into hopper 12 flows into the recess for discharge through outlet pipe 14. Placement of metering tube 31 in outlet pipe 14 permits the liquid mix to be discharged from hopper 12 and into chamber 16 only during predetermined intervals. This discharge will occur instantaneously upon the lifting of valve element 46 by solenoid and plunger 18. Air is permitted to enter at the top of housing 32 through slot 54 in alignment cap 52. The diameter of opening 34 through which the liquid mix may enter housing 32 is determined as a function of the type of mix being processed. That is, the mix for a soft serve ice cream will have a different size opening 34 than the mix for a milk shake, and the like. The metering tube 31 for any application can be positioned in hopper 12 in place of another metering tube 31 by removing the complete assembly from hopper outlet pipe 14 and disengaging lift rod 47 from plunger 51. The seals shown in FIG. 2 of the drawings and referred to above can help prevent an accumulation of air bubbles in hopper 12 by preventing leakage of air back into hopper 12 from chamber 16.

Whenever handle 22 of spigot 20 is turned to its open position, cam 56 located above spigot 20 will make contact with the contact 58 of switch 24. This action will complete an electrical circuit and energize solenoid and plunger 18 to lift valve element 46 away from valve seat 38 to open the ports formed by openings 34 and 36 and permit replenishment of liquid in chamber 16. Although openings 34 and 36 are only adjustable by replacing one housing 32 with another such housing having different dimensions of openings 34 and 36, valve element 46 may be preset on lift rod 47 to produce a desired overrun. For example, if opening 34 is five-sixteenth inch in diameter and valve element 46 three-eighth inch, with other dimensions proportional, a lift of one-half inch of valve element 46 away from valve seat 38 by solenoid and plunger 18 will produce an overrun of 40 percent to 45 percent. In this manner, the liquid mix-air ratio and overrun can be easily controlled by using a housing 32 of predetermined dimensions and adjusting the lift of valve element 46 with respect to valve seat 38 by means of suitable adjusting structure, such as screw threads, not shown, mounting valve element 46 on lift rod 47.

When handle 22 is returned to a closed position of spigot 20, solenoid and plunger 18 will be de-energized and the weight of valve element 46 will cause it to instantly move toward and seat with valve seat 38 to cut off the flow into chamber 16.

The foregoing is considered as illustrative only of the principles of the inventon. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Dispensing apparatus, comprising, in combination:
   a. a hopper having a bottom provided with an outlet, and an outlet pipe affixed to the bottom of the hopper and arranged extending from the hopper, the outlet pipe being arranged surrounding the outlet;
   b. a measuring tube housing in the form of a longitudinally extending tube provided with a pair of spaced, open ends, one of which open ends is provided with a restriction forming a valve seat and an enlarged portion arranged adjacent the one of the open ends and partially forming a wall of the tube, and an opening provided in the enlarged portion substantially at a right angle with respect to the one of the open ends, the enlarged portion spaced from one of the open ends a distance permitting the enlarged portion to form an abutment engaging a bottom of the hopper and limiting insertion of the one of the open ends into the outlet pipe associated with the hopper, the one of the open ends being sealingly inserted into the pipe outlet;
   c. a valve element movably arranged in the housing for selective movement toward and away from the one of the open ends and between sealing engagement with the fluid passing disengagement from the restriction forming the valve seat; and
   d. a spigot arranged for controlling flow from a freezing chamber associated with the hopper outlet pipe, and a solenoid connected to the valve element and to the spigot for being actuated by a flow permitting position of the spigot and unblocking the one of the open ends and maintaining a constant amount of a material passing from the hopper to a freezing chamber while preventing air from escaping from the freezing chamber to the hopper during blending of the material in the freezing chamber.

2. A structure defined in claim 1, wherein a slotted cap is arranged in the other of the open ends of the tube ends of the tube for aligning the valve element and permitting a fluid to enter the tube.

* * * * *